US012798305B2

(12) United States Patent
Woods et al.

(10) Patent No.: US 12,798,305 B2
(45) Date of Patent: Nov. 17, 2026

(54) SYSTEMS AND METHODS FOR A VEHICLE FRAME WITH AN INTEGRATED FLAT TOW ADAPTER

(71) Applicant: Toyota Motor Engineering & Manufacturing North America, Inc., Plano, TX (US)

(72) Inventors: Brian Woods, Brighton, MI (US); Jarrod LiPuma, Ann Arbor, MI (US); David T. Nakayama, Canton, MI (US)

(73) Assignees: TOYOTA MOTOR ENGINEERING & MANUFACTURING NORTH AMERICA, INC., Plano, TX (US); TOYOTA JIDOSHA KABUSHIKI KAISHA (JP)

( * ) Notice: Subject to any disclaimer, the term of this patent is extended or adjusted under 35 U.S.C. 154(b) by 412 days.

(21) Appl. No.: 18/385,732

(22) Filed: Oct. 31, 2023

(65) Prior Publication Data

US 2025/0135812 A1 May 1, 2025

(51) Int. Cl.
*B60D 1/02* (2006.01)
*B60D 1/56* (2006.01)

(52) U.S. Cl.
CPC ................. *B60D 1/02* (2013.01); *B60D 1/56* (2013.01); *B60D 1/565* (2013.01)

(58) Field of Classification Search
CPC .................................... B60D 1/56; B60D 1/02
USPC .................................................. 280/500, 501
See application file for complete search history.

(56) References Cited

U.S. PATENT DOCUMENTS

| | | | | |
|---|---|---|---|---|
| 4,111,449 A | 9/1978 | Hancock | | |
| 4,863,185 A | 9/1989 | Coppe | | |
| 5,716,066 A * | 2/1998 | Chou | B60D 1/56 | 280/460.1 |
| 7,137,658 B2 * | 11/2006 | Haneda | B60D 1/565 | 293/117 |
| 7,300,080 B2 | 11/2007 | Rebuffet et al. | | |
| 7,472,919 B2 * | 1/2009 | Pratt | B60D 1/565 | 280/495 |
| 7,819,417 B2 * | 10/2010 | Jones | B60R 19/48 | 280/495 |
| 8,246,069 B2 * | 8/2012 | Ladzinski | B60D 1/56 | 280/495 |

(Continued)

FOREIGN PATENT DOCUMENTS

| | | | |
|---|---|---|---|
| CA | 2740486 A1 * | 11/2011 | B60D 1/565 |
| DE | 10326856 A1 * | 1/2005 | B60D 1/565 |

(Continued)

*Primary Examiner* — James A Shriver, II
(74) *Attorney, Agent, or Firm* — Snell & Wilmer LLP

(57) ABSTRACT

A vehicle configured to be flat towed. The vehicle includes a body structure including a front side member support having an end portion and a bumper beam mounted to the end portion. The body structure further includes a front side member plate mounted to the end portion of the front side member support. A towing bracket can be mounted to the vehicle via the front side member plate. A nut fastener can be mounted to the front side member plate whereby a towing bracket adapter is threadingly (e.g., removably) coupled to the nut fastener. A towing bracket can be attached directly to the front side member plate (e.g., via a weld). A flat tow base plate can also be mounted to the body structure via a fastener (e.g., a bolt).

17 Claims, 7 Drawing Sheets

(56) References Cited

U.S. PATENT DOCUMENTS

| | | | | |
|---|---|---|---|---|
| 8,276,930 | B1 | 10/2012 | Hesse et al. | |
| 8,308,184 | B2 * | 11/2012 | Hodoya | B60D 1/565 280/495 |
| 8,678,423 | B1 * | 3/2014 | Hwang | B60R 19/34 280/505 |
| 9,221,312 | B2 * | 12/2015 | Sandberg | B60D 1/48 |
| 10,065,468 | B2 | 9/2018 | Virupaksha et al. | |
| 10,919,351 | B1 * | 2/2021 | Corwin | B60D 1/56 |
| 10,926,592 | B2 | 2/2021 | Vannahmen | |
| 10,946,703 | B2 | 3/2021 | Perotti | |
| 11,351,823 | B2 | 6/2022 | Khandelwal et al. | |
| 11,550,035 | B2 | 1/2023 | Fields et al. | |
| 2011/0187081 | A1 * | 8/2011 | Ando | B60D 1/52 280/477 |
| 2011/0285107 | A1 * | 11/2011 | Ladzinski | B60D 1/565 280/495 |
| 2022/0363211 | A1 | 11/2022 | Gunther et al. | |
| 2023/0158846 | A1 * | 5/2023 | Kim | B60D 1/56 280/500 |
| 2025/0135812 | A1 * | 5/2025 | Woods | B60D 1/565 |

FOREIGN PATENT DOCUMENTS

| | | | | | |
|---|---|---|---|---|---|
| DE | 102017108144 | A1 | * | 10/2017 | B60R 19/023 |
| DE | 102018216631 | A1 | * | 4/2019 | B60R 19/34 |
| FR | 2894554 | A1 | * | 6/2007 | B60R 19/24 |
| GB | 2609946 | A | * | 2/2023 | B60R 19/34 |
| JP | 2002053065 | A | * | 2/2002 | B60D 1/488 |
| JP | 2002053066 | A | * | 2/2002 | B60D 1/52 |
| JP | 2002331889 | A | * | 11/2002 | |

* cited by examiner

SYSTEMS AND METHODS FOR A VEHICLE FRAME WITH AN INTEGRATED FLAT TOW ADAPTER

BACKGROUND

Field

This disclosure relates to systems and methods for flat towing a vehicle, and more particularly to adapters for coupling a tow bar to a vehicle frame.

Description of the Related Art

Many vacationers and travelers like to tour and sightsee in their cars or vehicles and oftentimes buy or rent a motorhome or a recreational vehicle (RV) to enhance their comfort and enjoyment. For extended vacations, the motorhome or the RV may be hooked up to tow another vehicle (e.g., their car or vehicle, a cargo trailer, a smaller vehicle, or a sports utility vehicle (SUV)). When parked, the vehicle being towed can be disconnected from the towing vehicle to allow the vacationers and travelers to take excursions or drive into town and have a more mobile, fuel efficient, and compact vehicle while the motorhome or the RV is parked at a campground, for example.

In many situations, the vehicle being towed (sometimes referred to as a towed vehicle) is being flat-towed (i.e., all wheels are on the ground). In order to couple the towed vehicle to the towing vehicle in the first place, it is necessary to install an aftermarket flat tow base plate onto the vehicle front bumper, which can be time consuming, complex, and costly. Often, these aftermarket flat tow base plates require that several front-end components of the vehicle be removed in order to access the attachment points of the flat tow base plates to the vehicle. Therefore, what is needed is a vehicle that has a built-in tow bar attachment point that requires minimal time and effort for attaching a tow bar when it is desired to flat tow the vehicle.

SUMMARY

In general, aspects of the subject matter described in this disclosure may be embodied in a vehicle. The vehicle includes a body structure. The body structure includes a front side member support having an end portion, a bumper beam mounted to the end portion of the front side member support, and a front side member plate mounted to the end portion of the front side member support.

These and other embodiments may optionally include one or more of the following features.

The body structure can further include a nut fastener mounted to the front side member plate. The nut fastener can be welded to the front side member plate. The body structure can further include a towing bracket adapter threadingly coupled to the nut fastener. The towing bracket adapter can define a bore that is forward-facing when the towing bracket adapter is attached to the nut fastener. The bore can be configured to receive a towing bracket for flat towing the vehicle.

The front side member plate can include a central portion, an aperture disposed in the central portion, and a flange portion extending from the central portion. The front side member plate can be mounted to the end portion of the front side member support via the flange portion. The nut fastener can extend through the aperture. The nut fastener can extend from an outer surface of the central portion of the front side member plate.

The body structure can further include a front bumper mounting plate mounted to the end portion of the front side member support. The front bumper mounting plate can be located forward of the front side member plate. The front bumper mounting plate can be located between the bumper beam and the front side member plate. The bumper beam can be mounted to the end portion of the front side member support via the front bumper mounting plate. The front bumper mounting plate can include a central portion, an aperture disposed in the central portion, and a flange portion extending from the central portion. The front bumper mounting plate can be mounted to the end portion of the front side member support via the flange portion. The nut fastener can extend through the aperture.

The towing bracket adapter can include a tab disposed in the bore that is configured to stop the towing bracket from exiting the bore in response to the towing bracket being rotated to a locked rotational position.

The vehicle can further include a vehicle panel and an aperture disposed in the vehicle panel, and the aperture is aligned with the towing bracket adapter.

In various embodiments, the body structure can further include a towing bracket adapter attached to the front side member plate. The towing bracket adapter can be permanently fixed to the front side member plate. The towing bracket adapter can be welded to the front side member plate. The towing bracket adapter can extend through the front side member plate. The towing bracket adapter can extend through the front bumper mounting plate. The vehicle can further include a vehicle panel and an aperture disposed in the vehicle panel, and the aperture is aligned with the towing bracket adapter.

In various embodiments, a nut fastener is mounted to the front side member plate and a vehicle panel has an aperture aligned with the nut fastener. The vehicle can further include a flat tow base plate including a lateral beam and a pair of longitudinal beams extending from the lateral beam. The vehicle can further include a fastener configured to be received within a first longitudinal beam of the pair of longitudinal beams, the fastener is configured to be threadingly coupled to the nut fastener. The vehicle can further include a pair of towing brackets configured to be coupled to the lateral beam for flat towing the vehicle. The first longitudinal beam can be configured to extend through the aperture in the vehicle panel when the flat tow base plate is installed to the vehicle.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale and may be exaggerated to better illustrate the important features of the present invention.

DETAILED DESCRIPTION

A vehicle of the present disclosure is configured to be flat towed. The vehicle includes a body structure including a front side member support having an end portion and a bumper beam mounted to the end portion. The body structure further includes a front side member plate mounted to the end portion of the front side member support. In some embodiments, a nut fastener is attached to the front side member plate (e.g., via a weld or the like). A towing bracket adapter can be threadingly (e.g., removably) coupled to the nut fastener. A tow bar base plate can be mounted to the nut fastener via one or more fasteners. In other embodiments, a towing bracket adapter is mounted directly to the front side member plate (i.e., without the nut fastener). For example, the towing bracket adapter can be permanently mounted to the front side member plate via a weld. The towing bracket adapter is mounted behind the front fascia of the vehicle.

Particular embodiments of the subject matter described in this disclosure may be implemented to realize one or more of the following advantages. A vehicle of the present disclosure eliminates the need for users to install aftermarket flat tow attachment means onto the vehicle front bumper when the user wants to flat tow their vehicle. Moreover, tow bar attachment assemblies described herein provide aesthetically pleasing (e.g., due to being concealed by a front vehicle panel) attachment points while also providing ease of access to the attachment points without having to perform disassembly of any major vehicle components.

Figure 1:
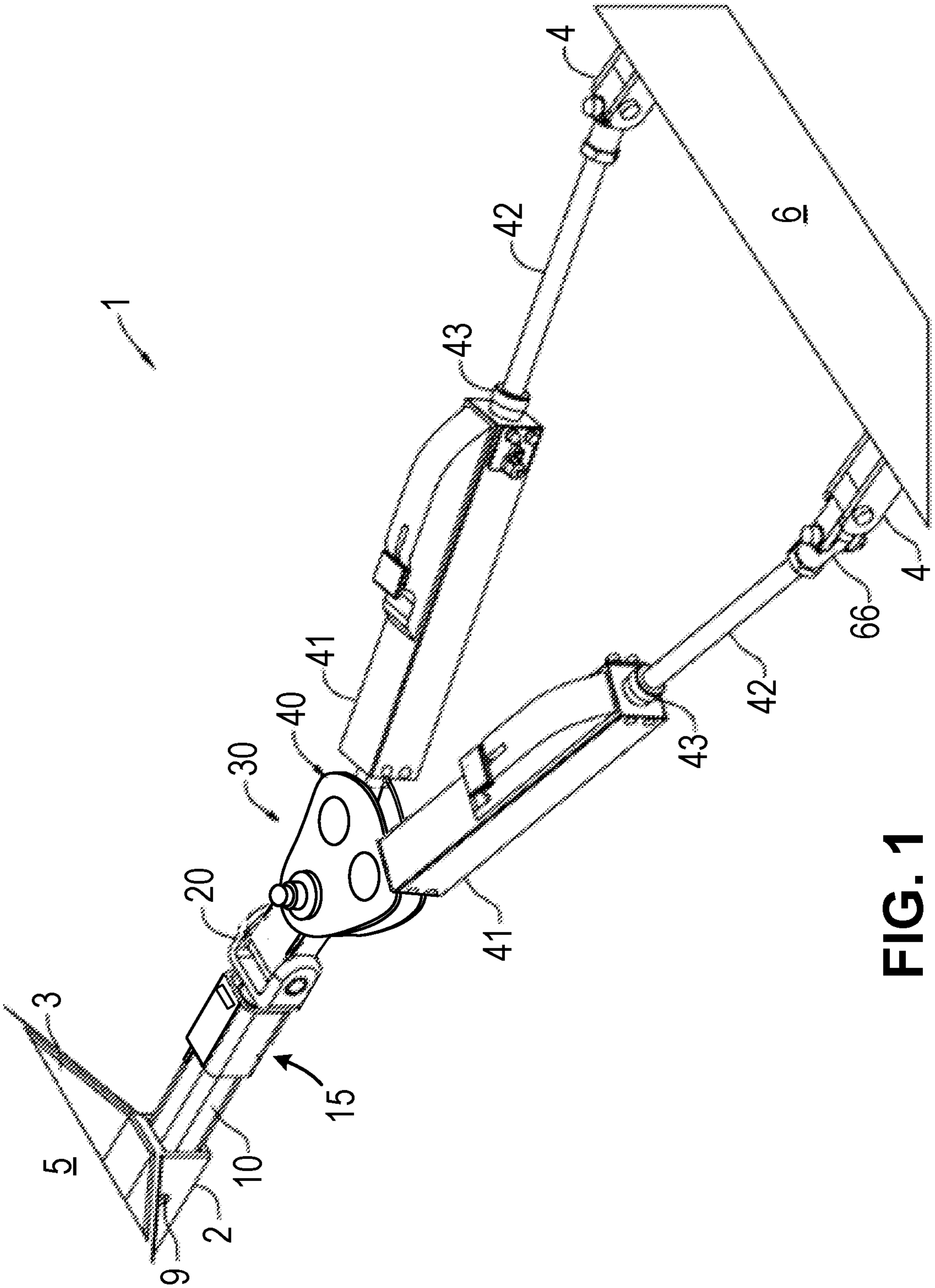
FIG. 1 is an exemplary drawing showing a towing vehicle towing a towed vehicle where the towed vehicle is being flat towed according to an aspect of the invention.

FIG. 1 illustrates an exemplary tow bar 1 coupled between a towing vehicle 5 (e.g., a motorhome, a recreational vehicle (RV), a sport utility vehicle (SUV), a truck, or the like) and a towed vehicle 6 (e.g., a SUV), where the towed vehicle 6 is being flat towed (i.e., all wheels are on the ground). The towing vehicle 5 and the towed vehicle 6 can be a conveyance capable of transporting a person, an object, or a permanently or temporarily affixed apparatus. The towing vehicle 5 and the towed vehicle 6 can be a self-propelled wheeled conveyance, such as a motorhome or a recreational vehicle (RV), a car, a sports utility vehicle, a truck, a bus, a van, a trailer or other motor, battery, or fuel cell driven vehicle. For example, the towing vehicle 5 and the towed vehicle 6 can be an electric vehicle, a hybrid vehicle, a hydrogen fuel cell vehicle, a plug-in hybrid vehicle or any other type of vehicle that has an engine, a fuel cell stack, a motor and/or a generator. Other examples of vehicles include bicycles, trains, planes, or boats, and any other form of conveyance that is capable of transportation. The towing vehicle 5 and the towed vehicle 6 can be semi-autonomous or autonomous. That is, the towing vehicle 5 and the towed vehicle 6 can be self-maneuvering and navigate without human input.

As is seen in the exemplary illustrated embodiment, the tow bar 1 generally includes a shank 10 that is sized and shaped to be inserted into a receiver 2 of a towing hitch 3 mounted on the towing vehicle 5. A proximal end of the shank 10 is shaped and sized to releasably connect to (e.g., insert into) the receiver 2 of the towing hitch 3. The receiver 2 can be a hollow rectangular tube. The inner dimension of the receiver 2 can be slightly larger than the outer dimension of the shank 10 so as to allow the shank 10 to be slidably inserted into and received by the receiver 2. The shank 10 can be inserted into the hitch receiver 2 and held in the receiver 2 by way of a locking pin (not shown) inserted into aligned holes, respectively, located in the lateral sides of the shank 10 and the receiver 2. For example, a hole 9 is illustrated in a lateral side of the receiver 2 which can align with a similar hole in the shank 10 whereby a locking pin can be inserted therethrough.

The tow bar 1 further includes a pair of swing arms 43 configured to be connected to towing brackets 4 of the towed vehicle 6. Accordingly, the tow bar 1 is configured for connecting the towing hitch 3 on the towing vehicle 5 to the towed vehicle 6 having two towing brackets 4. FIG. 1 shows the tow bar 1 with the shank 10 of the tow bar 1 inserted into the receiver 2 and distal ends 42 of the swing arms 43 are connected to the towing brackets 4 on the towed vehicle 6.

In practical use, the towing vehicle 5 will normally be situated upon a roadway surface considered horizontal in reference to the towing vehicle 5. Thus, the directional terms "vertical" and "horizontal" and the like are used to describe the tow bar 1 and its components with respect to the orientation illustrated in FIG. 1 and are employed merely for the purposes of clarity and illustration. In the orientation shown in FIG. 1, the shank 10 projects "horizontally" out from the receiver 2. One or more pivot couplers (e.g., pivot coupler 20, pivot coupler 30, and/or pivot coupler 40) connects a distal end 15 of the shank 10 to proximal ends of the swing arms 43. The directional terms "proximal" and "distal" and the like are used herein with respect to the described tow bar 1 to refer to positions and locations on the tow bar 1 relative to the receiver 2 when holding the tow bar 1.

In various embodiments, each swing arm 43 can be extendable and can be locked to hold the swing arm at its extended length. The distal end 42 of each swing arm 43 can include a coupler 66 for connection to one of the towing brackets 4 on the towed vehicle 6.

Figure 2A:
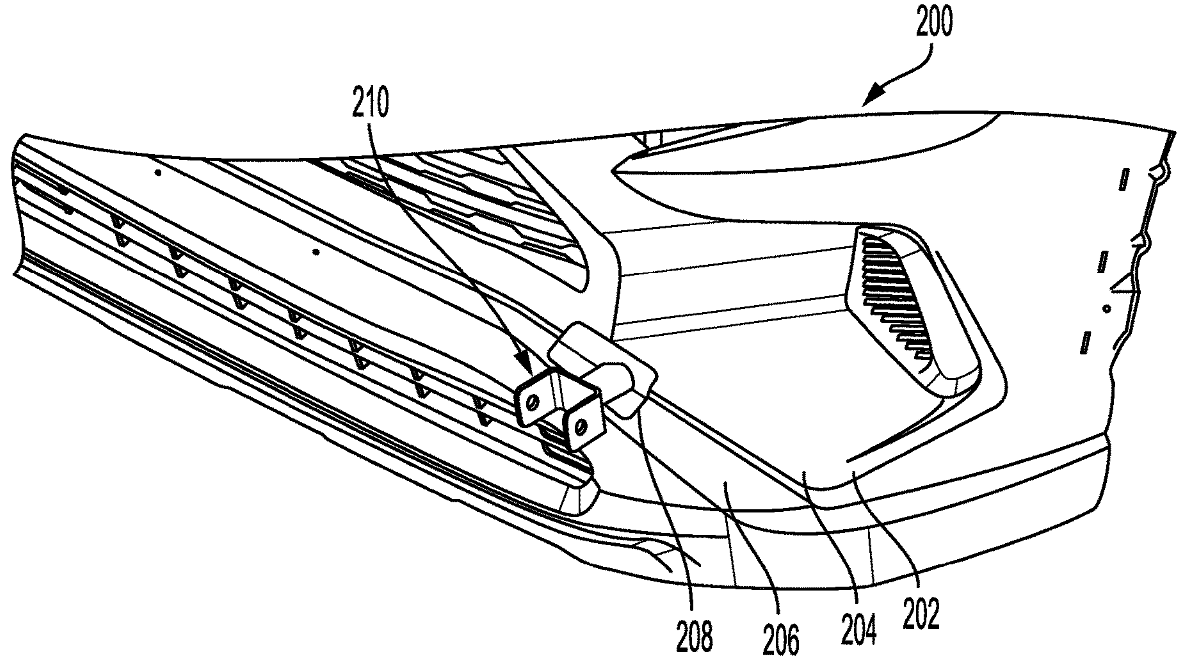
FIG. 2A is a perspective view of a front portion of a vehicle having a pair of towing brackets protruding through the front fascia of the vehicle according to an aspect of the invention.

FIG. 2A illustrates a perspective view of an example vehicle 200 configured to be flat towed. The vehicle 200 includes a pair of towing brackets 210 installed to the body structure or frame thereof, as described in greater detail below. Only one towing bracket 210 is illustrated in FIG. 2A, though it should be understood that a pair of towing brackets 210 is provided at the front of the vehicle 200, similar to the towed vehicle 6 of FIG. 1. The vehicle 200 can include a front bumper cover 202 disposed at a front end thereof and defining an outer aerodynamic surface 204 of the vehicle 200. The vehicle 200 can further include a lower grille panel 206 coupled adjacent to the front bumper cover 202. The lower grille panel 206 can further define the outer aerodynamic surface 204 of the vehicle 200. The lower grille panel 206 can be coupled to the front bumper cover 202. An aperture 208 can be disposed in the front bumper cover 202 and/or the lower grille panel 206 for accommodating one of the towing brackets 210. The towing bracket 210 can extend from a frame component of the vehicle through the aperture 208 so as to be accessible for coupling a tow bar (e.g., see tow bar 1 of FIG. 1) to the vehicle 200 for flat towing the vehicle 200. In the illustrated embodiment, the aperture 208 is defined by, and between, the front bumper cover 202 and the lower grille panel 206. However, the aperture 208 can be disposed only in the front bumper cover 202 or only in the lower grille panel 206. Moreover, the aperture 208 can be disposed in any vehicle panel that is part of the front fascia of the vehicle 200 at a location in front of the vehicle front bumper frame structure, depending on the particular design of the front paneling of the vehicle 200. Accordingly, as used herein the term "vehicle panel" can refer to a bumper cover, a lower grille panel, or any other vehicle panel that is part of the front fascia of the vehicle 200. A cap can be placed over or in the aperture 208 to cover the aperture 208 (e.g., for aerodynamic and/or aesthetic purposes) until it is desired to connect a tow bar to the vehicle 200.

Figure 2B:
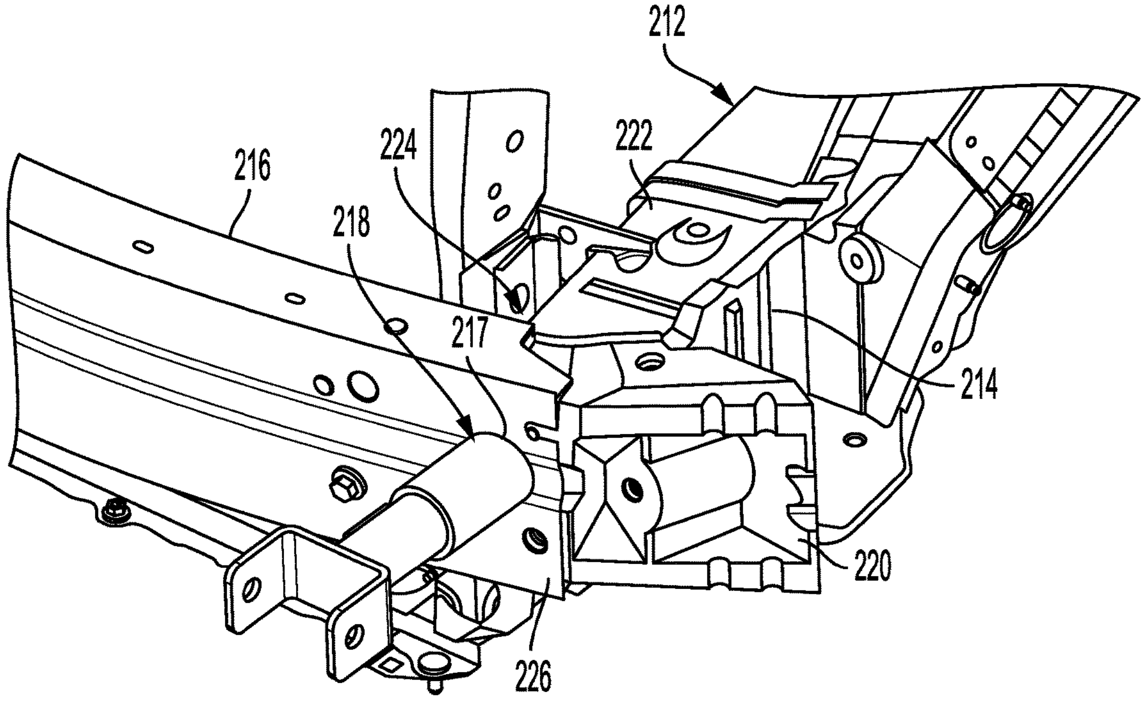
FIG. 2B is an enlarged view of the vehicle body of the vehicle of FIG. 2A having a towing bracket adapter according to an aspect of the invention.

With reference to FIG. 2B, the vehicle 200 has a body structure 212. The body structure 212 includes a front side member extension 214, a bumper beam 216, and a tow bar attachment assembly 218. The front side member extension 214, the bumper beam 216, and the tow bar attachment assembly 218 can be located at a front end of the body structure 212 of the vehicle 200, as shown. Alternatively, the front side member extension 214, the bumper beam 216, and the tow bar attachment assembly 218 can be located at a rear end of the body structure 212 of the vehicle 200, in which case the front side member extension can be a rear side member extension, for example if the vehicle 200 is being towed from the rear. The body structure 212 can further include a front bumper extension 220 extending from the bumper beam 216. The front bumper extension 220 can extend away (e.g., sideways) from a centerline of the vehicle 200.

The body structure 212 can further include a front side member support 222. The front side member support 222 can be attached to the front side member extension 214. The front side member support 222 can be a portion of the front side member extension 214 adjacent to the bumper beam 216. The front side member support 222 can be configured to absorb energy when the vehicle 200 is subjected to an external force. The bumper beam 216 can be configured to receive the external force and to distribute the external force to one or more front side member supports 222.

The tow bar attachment assembly 218 can extend through the bumper beam 216. The bumper beam 216 can include an aperture 217 configured to accommodate the tow bar attachment assembly 218.

Figure 2C:
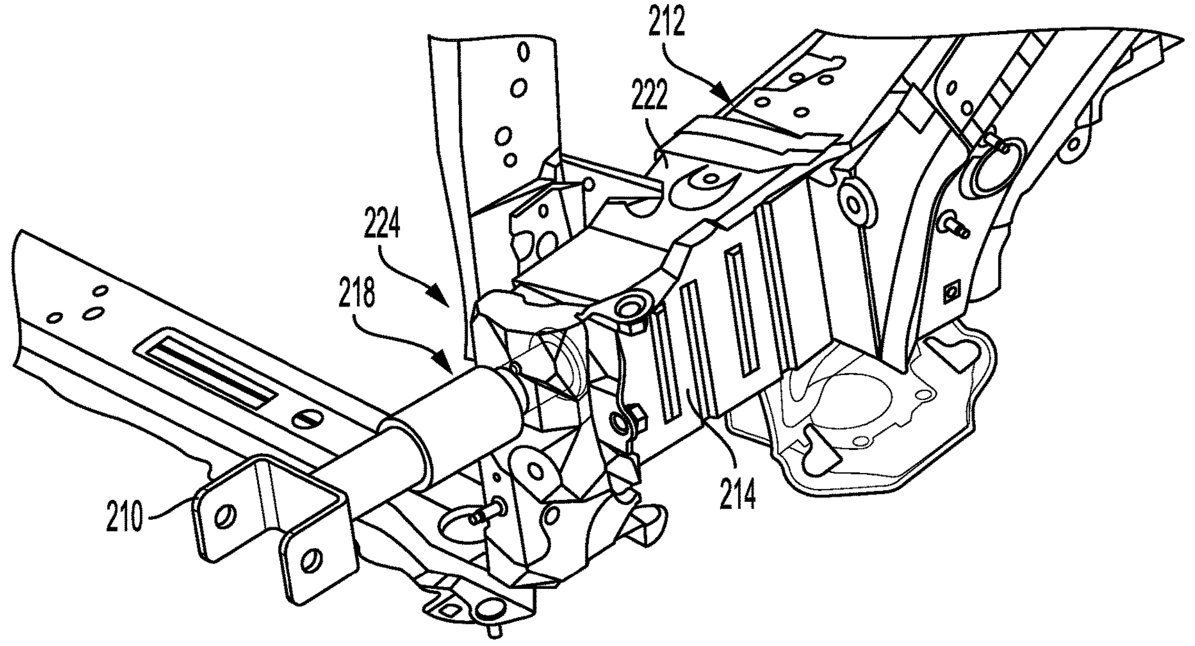
FIG. 2C is a perspective view of the body structure of FIG. 2B with the front bumper beam omitted according to an aspect of the invention.

With additional reference to FIG. 2C, which shows the body structure 212 with the bumper beam 216 and the front bumper extension 220 omitted for ease of illustration, the front side member extension 214 has an end portion 224, proximate to the bumper beam 216. The bumper beam 216 has a first side 226, proximate to the end portion 224 of the front side member extension 214, and a second side proximate to a second end portion of a second front side member extension (e.g., in a mirrored fashion as shown in FIG. 2B).

Figure 2D:
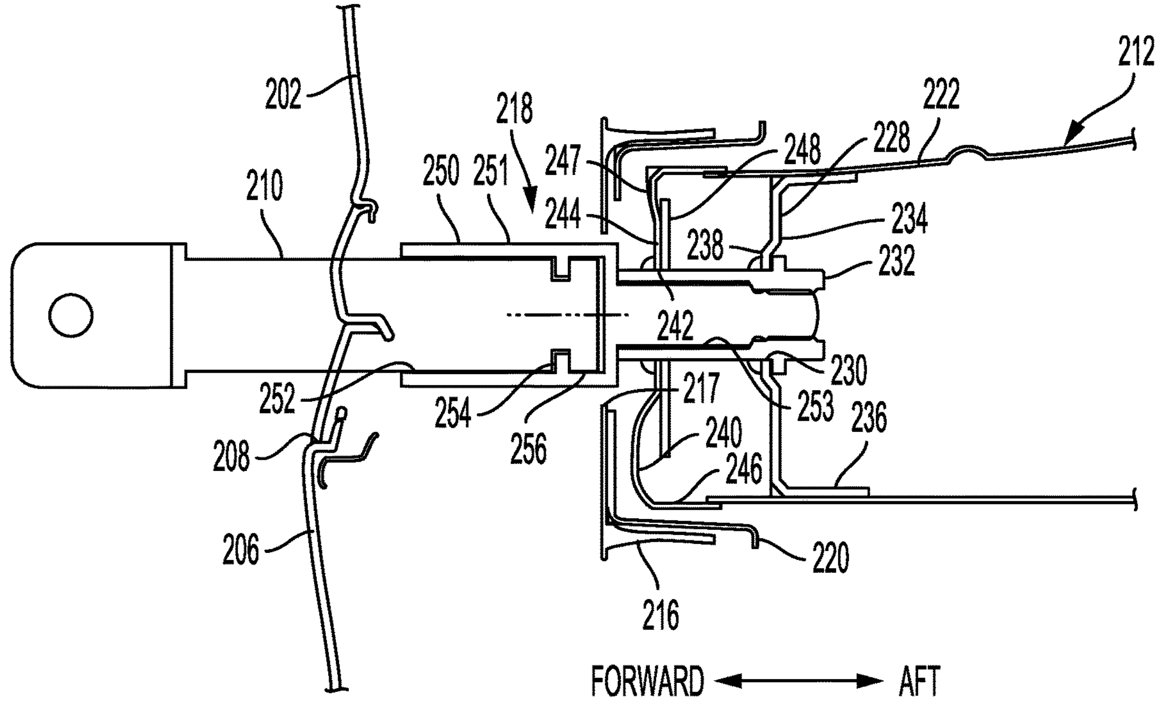
FIG. 2D is a section view of the body structure of the vehicle of FIG. 2A according to an aspect of the invention.

With combined reference to FIG. 2C and FIG. 2D, a front side member plate 228 is coupled to the front side member support 222. The front side member plate 228 defines a forward-facing aperture 230 (also referred to herein as a member plate aperture) configured to receive a nut fastener 232. The front side member plate 228 has a central portion 234 and a flange portion 236. The central portion 234 defines the aperture 230 and the flange portion 236 is attached to the front side member support 222. The front side member plate 228 can be made of a metal material, such as steel or an aluminum alloy. Alternatively, the front side member plate 228 can be made of a reinforced or unreinforced nonmetal material. The nut fastener 232 is attached to the central portion 234 of the front side member plate 228 and extends from an outer surface 238 of the central portion 234 of the front side member plate 228. The nut fastener 232 can be attached in or to the center of the central portion 234 of the front side member plate 228 or at any other location in the central portion 234 of the front side member plate 228. The nut fastener 232 can be attached to the central portion 234 of the front side member plate 228 via a weld, a mechanical fastener, or any other suitable attachment method.

In various embodiments, a front bumper mounting plate 240 is coupled to the front side member support 222. The front bumper mounting plate 240 can be located forward of the front side member plate 228. The front bumper mounting plate 240 can be located between the front side member plate 228 and the front bumper beam 216. The front bumper mounting plate 240 defines a forward-facing aperture 242 (also referred to herein as a mounting plate aperture) configured to receive the nut fastener 232. The front bumper mounting plate 240 has a central portion 244 and a flange portion 246. The central portion 244 defines the aperture 242 and the flange portion 246 is attached to the front side member support 222. The front bumper mounting plate 240 can be made of a metal material, such as steel or an aluminum alloy. Alternatively, the front bumper mounting plate 240 can be made of a reinforced or unreinforced nonmetal material. The nut fastener 232 is attached to the central portion 244 of the front bumper mounting plate 240 and extends from an outer surface 247 of the central portion 244 of the front bumper mounting plate 240. The nut fastener 232 can be attached in the center of the central portion 244 of the front bumper mounting plate 240 or at any other location in the central portion 244 of the front bumper mounting plate 240. The nut fastener 232 can be attached to the central portion 244 of the front bumper mounting plate 240 via a weld, a mechanical fastener, or any other suitable attachment method.

A front bumper stopper 248 of the front bumper extension 220 and/or the front bumper beam 216 can be coupled to the front bumper mounting plate 240. The front bumper stopper 248 can be coupled to, and/or be part of, the front bumper extension 220. The front bumper stopper 248 can be coupled to, and/or be part of, the front bumper beam 216. The front bumper stopper 248 can be coupled to an inside surface (e.g., a rear facing surface) of the front bumper mounting plate 240. The front bumper beam 216 can be coupled to the front bumper mounting plate 240 via the front bumper stopper 248.

The nut fastener 232 is configured to attach a towing bracket adapter 250 to the nut fastener 232. The nut fastener

232 can be configured with an internal thread for attaching the towing bracket adapter 250. The towing bracket adapter 250 can be configured with an external thread configured to engage the internal thread of the nut fastener 232 when the towing bracket adapter 250 is attached to the nut fastener 232. The towing bracket adapter 250 can be attached to the nut fastener 232 via engagement of the external thread of the towing bracket adapter 250 with the internal thread of the nut fastener 232. Accordingly, the towing bracket adapter 250 can be a thread in adapter. Stated differently, the towing bracket adapter 250 can be threadingly coupled to the nut fastener 232. Alternatively, the towing bracket adapter 250 can be attached to the nut fastener 232 via any other suitable attachment method.

The towing bracket adapter 250 can extend beyond (i.e., in the forward direction) the front bumper beam 216 toward the front bumper cover 202 and/or the lower grille panel 206. In various embodiments, the towing bracket adapter 250 terminates just aft of the front bumper cover 202 and/or the lower grille panel 206 so that the towing bracket adapter 250 can be hidden (i.e., covered) behind the front bumper cover 202 and/or the lower grille panel 206. The towing bracket adapter 250 aligns with the aperture 208 such that the towing bracket 210 can extend from the towing bracket adapter 250 through the aperture 208 when the towing bracket 210 is attached to the towing bracket adapter 250.

The towing bracket adapter 250 includes a bore 252 configured to receive a portion of the towing bracket 210. The bore 252 can be a forward-facing bore when installed on the vehicle 200. At least one tab 254 is disposed in the bore 252 to mechanically stop the towing bracket 210 from exiting the bore 252. At least one lug 256 extends from the towing bracket 210 and is configured to engage the tab 254.

The towing bracket adapter 250 includes the hollow bore portion 251 and a rod portion 253 extending aft from the hollow bore portion 251 and into the nut fastener 232. The rod portion 253 can include the external thread. In various embodiments, the rod portion 253 is smaller in diameter than the hollow bore portion 251.

Aspects of a thread-in adapter, for example as illustrated in FIG. 2A through FIG. 2D, includes a vehicle body/bumper structure designed to manage the increased load from flat towing, as well as meet all regulatory standards. Aspects of the thread-in adapter allow a user to add this adapter to their vehicle to attach an industry standard attachment, which would then attach to a tow bar connected to the tow vehicle, in accordance with various embodiments. Aspects of the thread-in adapter allows a user to retain the usage of a tow hook when the adapter is not installed, in accordance with various embodiments.

Figure 3A:
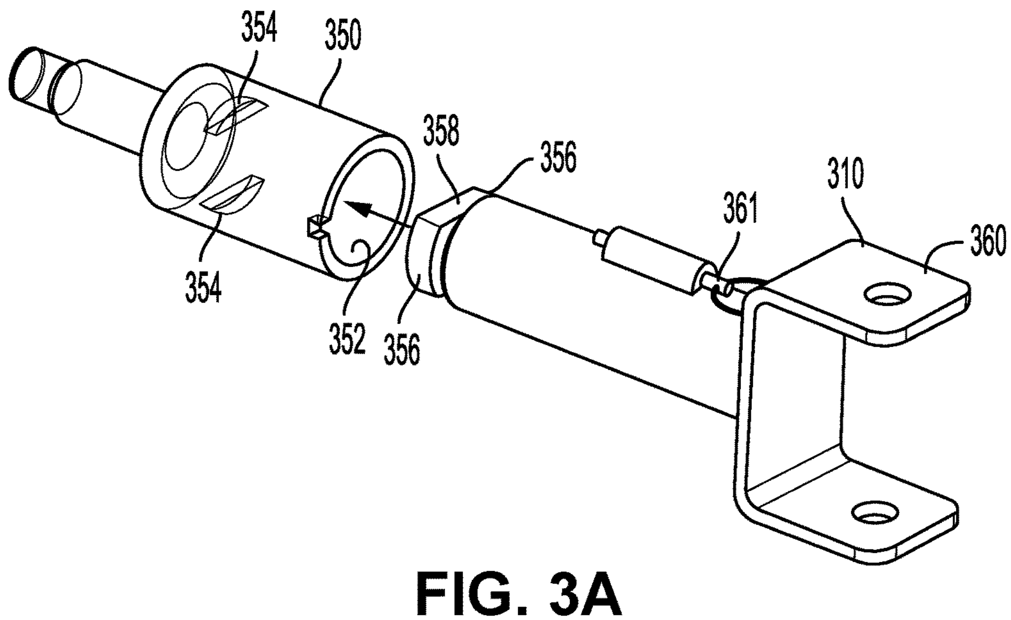
FIG. 3A, FIG. 3B, and FIG. 3C are perspective views of a towing bracket being installed into an exemplary towing bracket adapter according to an aspect of the invention.
Figure 3B:
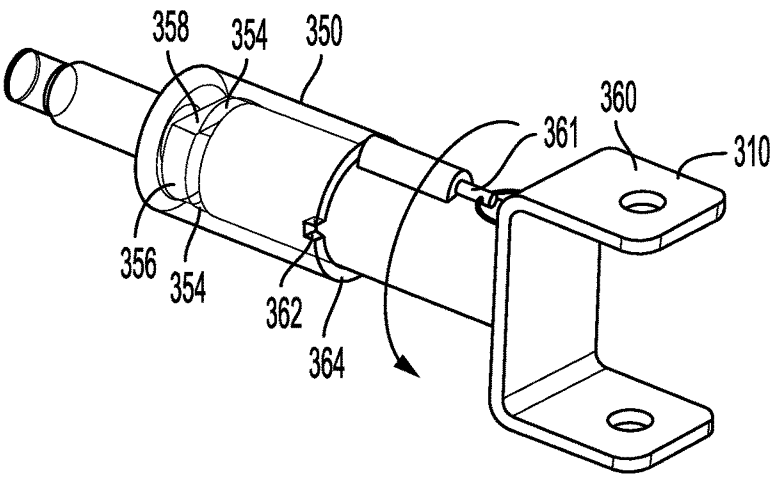
Figure 3C:
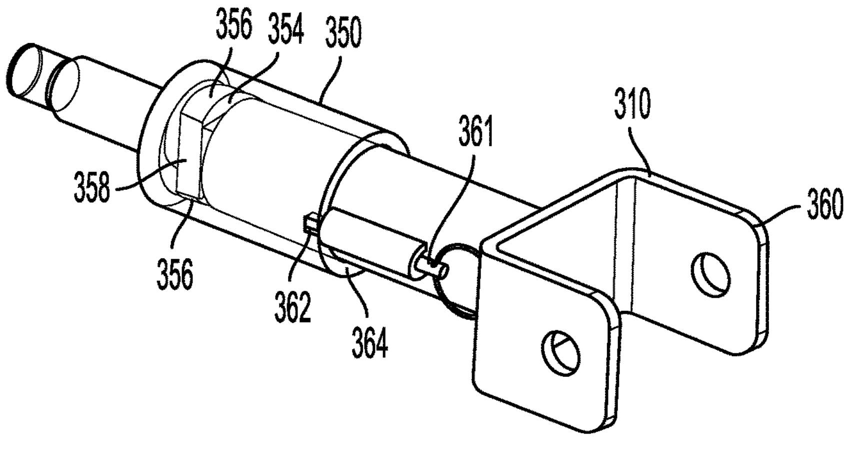

FIG. 3A, FIG. 3B, and FIG. 3C illustrate an exemplary towing bracket 310 being installed into an exemplary towing bracket adapter 350. In various embodiments, the towing bracket 210 and the towing bracket adapter 250 are similar to the towing bracket 310 and the towing bracket adapter 350, respectively. The towing bracket 310 can include a lug 356 and a relief portion 358 disposed at a first end of the towing bracket 310 that is configured to be received into the bore 352 of the towing bracket adapter 350. The towing bracket 310 can further include a clevis 360 disposed at a second end of the towing bracket 310 whereby a tow bar can be attached to the towing bracket 310. As the first end of the towing bracket 310 is moved into the bore 352 of the towing bracket adapter 350, the relief portion 358 can clear the tab 354 such that the relief portion 358 and the lug 356 are moved past the tab 354. The bore 352 and the tab 354 can define a keyway such that, when in the proper rotational position, as illustrated, the towing bracket 310 can be fully inserted into the towing bracket adapter 350. With the relief portion 358 and the lug 356 inserted into the bore 352 past the tab 354 (see FIG. 3B), the towing bracket 310 can be rotated relative to the towing bracket adapter 350 so that the tab 354 is aligned with the lug 356 so as to physically stop the towing bracket 310 from being released from the towing bracket adapter 350 (see FIG. 3C).

In various embodiments, the towing bracket 310 further includes a pin 361 that engages a notch 362 disposed in a rim 364 of the towing bracket adapter 350. The pin 361 can stop the towing bracket 310 from rotating relative to the towing bracket adapter 350 when the towing bracket 310 is installed to the towing bracket adapter 350. The pin 361 can be spring-biased such that the pin 361 extends into the notch 362 when the towing bracket 310 is rotated to the locked rotational position as illustrated in FIG. 3C.

Figure 4A:
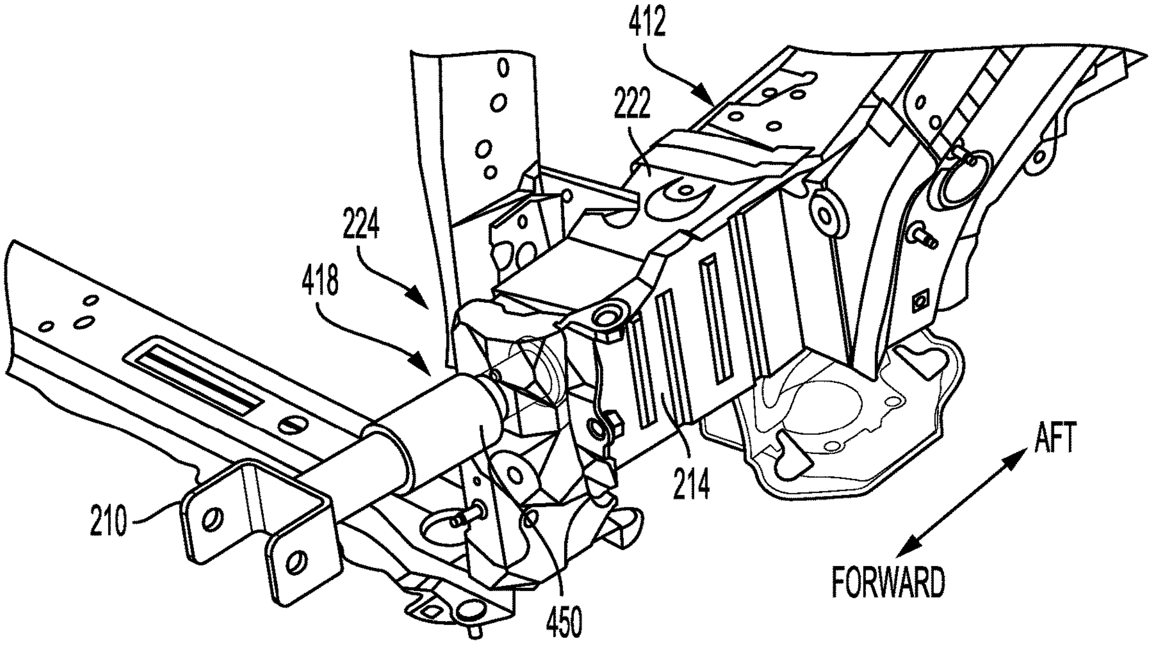
FIG. 4A is a perspective view of a vehicle body structure with a towing bracket adapter according to an aspect of the invention.
Figure 4B:
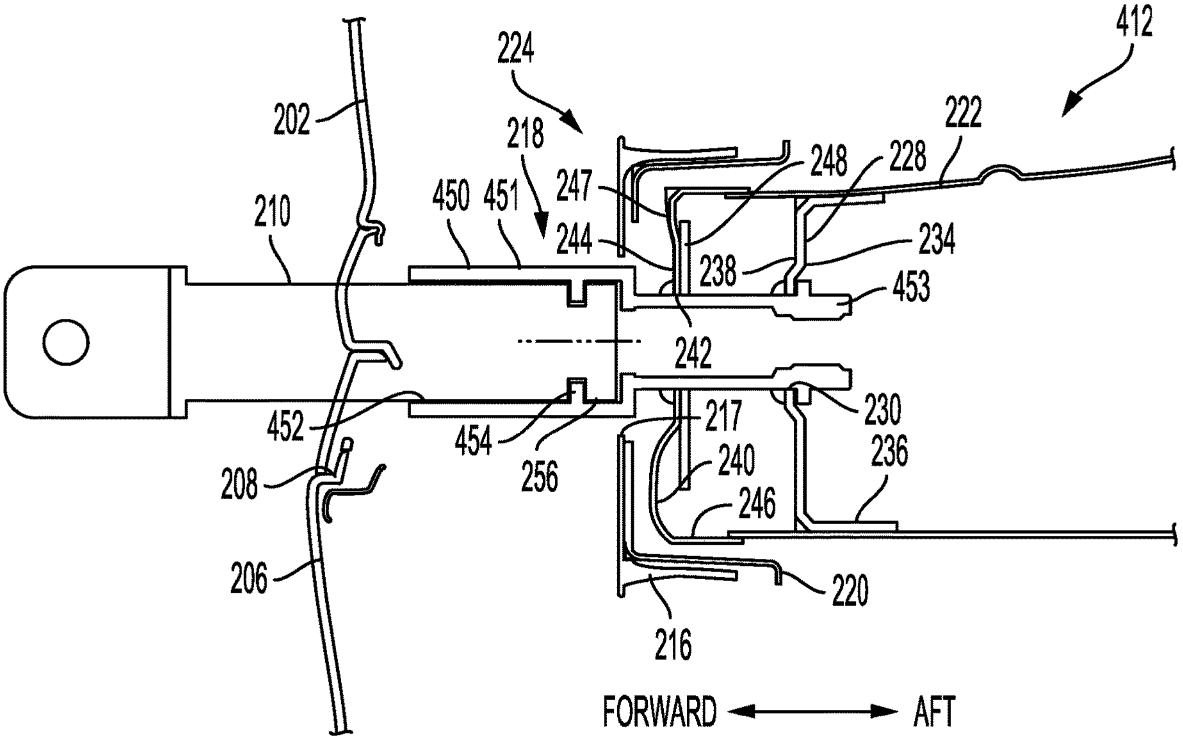
FIG. 4B is a section view of the body structure of FIG. 4B with a vehicle front fascia according to an aspect of the invention.

Aspects of a welded in adapter, for example as illustrated in FIG. 4A and FIG. 4B, includes a vehicle body/bumper structure designed to manage the increased load from flat towing, as well as meet all regulatory standards. The welded in adapter can be provided with the vehicle from the OEM. The welded in adapter allows the customer to attach an industry standard attachment, which would then attach to a tow bar connected to the tow vehicle, in accordance with various embodiments. Similar to the thread-in adapter, the welded in adapter allows a user to retain the usage of a tow hook when the adapter is not installed, in accordance with various embodiments.

With reference to FIG. 4A, a vehicle body structure 412 is illustrated that is similar to the body structure 212 of FIG. 2B, except the towing bracket adapter 250 and the nut fastener 232 are formed as a single component (referred to as a towing bracket adapter 450) permanently fixed to the body structure 412. With respect to FIG. 4A and FIG. 4B, elements with like element numbering, as depicted in FIG. 2C and FIG. 2D, are intended to be the same and will not necessarily be repeated for the sake of clarity. The body structure 412 includes a tow bar attachment assembly 418 including the towing bracket adapter 450 mounted to the end portion 224 of the front side member extension 214.

The towing bracket adapter 450 includes a hollow bore portion 451 and a rod portion 453 extending aft from the hollow bore portion 451. The rod portion 453 can be attached to the central portion 234 of the front side member plate 228. The rod portion 453 can extend from the outer surface 238 of the central portion 234 of the front side member plate 228. The rod portion 453 can be attached in the center of the central portion 234 of the front side member plate 228 or at any other location in the central portion 234 of the front side member plate 228. The rod portion 453 can be attached to the central portion 234 of the front side member plate 228 via a weld, a mechanical fastener, or any other suitable attachment method. In various embodiments, the rod portion 453 is attached to the central portion 234 of the front side member plate 228 via a weld.

The rod portion 453 can further be attached to the central portion 244 of the front bumper mounting plate 240. The rod portion 453 can extend from the outer surface 247 of the central portion 244 of the front bumper mounting plate 240. The rod portion 453 can be attached in or to the center of the central portion 244 of the front bumper mounting plate 240 or at any other location in the central portion 244 of the front bumper mounting plate 240. The rod portion 453 can be attached to the central portion 244 of the front bumper mounting plate 240 via a weld, a mechanical fastener, or any other suitable attachment method. In various embodiments, the rod portion 453 is attached to the central portion 244 of the front bumper mounting plate 240 via a weld. In various embodiments, the rod portion 453 is smaller in diameter than the hollow bore portion 451.

The towing bracket adapter 450 can extend beyond (i.e., in the forward direction) the front bumper beam 216 toward the front bumper cover 202 and/or the lower grille panel 206. In various embodiments, the towing bracket adapter 450 terminates just aft of the front bumper cover 202 and/or the lower grille panel 206 so that the towing bracket adapter 450 can be hidden (i.e., covered) behind the front bumper cover 202 and/or the lower grille panel 206, for example, when the vehicle is not being flat towed. The towing bracket adapter 450 aligns with the aperture 208 such that the towing bracket 210 can extend from the towing bracket adapter 450 through the aperture 208 when the towing bracket 210 is attached to the towing bracket adapter 450.

The towing bracket adapter 450 includes a bore 452 configured to receive a portion of the towing bracket 210. The bore 452 can be a forward-facing bore when installed on the vehicle 200. At least one tab 454 is disposed in the bore 452 to mechanically stop the towing bracket 210 from exiting the bore 452. At least one lug 256 extends from the towing bracket 210 and is configured to engage the tab 454.

Figure 5A:
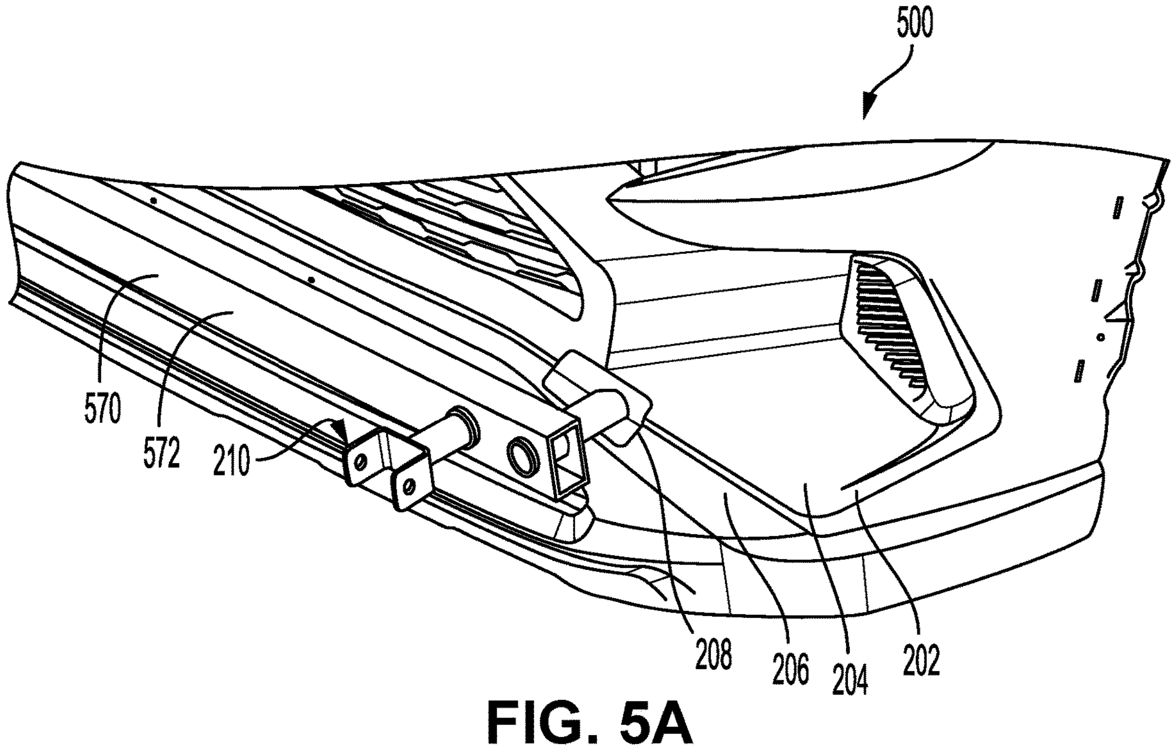
FIG. 5A is a perspective view of a front portion of a vehicle having a flat tow base plate removably installed to the vehicle according to an aspect of the invention.
Figure 5B:
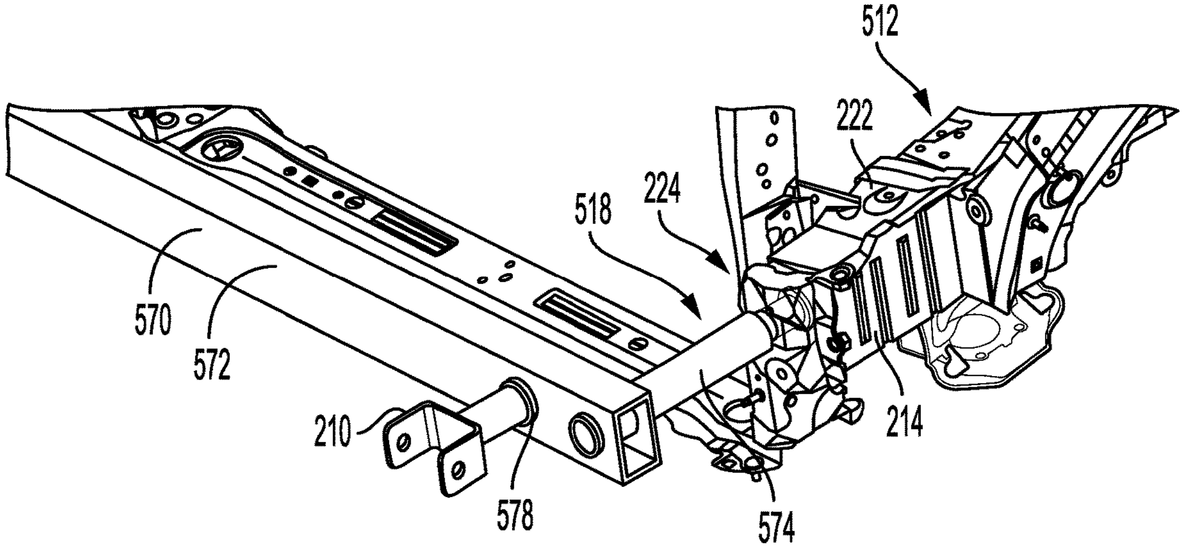
FIG. 5B is a perspective view of the flat tow base plate removably installed to the vehicle body of FIG. 5A according to an aspect of the invention.

With reference to FIG. 5A and FIG. 5B, a vehicle 500 and a vehicle body structure 512 for the vehicle 500, respectively, are illustrated in accordance with various embodiments. The vehicle 500 and the vehicle body structure 512 can be similar to the vehicle 200 and the vehicle body structure 212 of FIG. 2A and FIG. 2B, except that a flat tow base plate 570 is mounted to the end portion 224 of the front side member extension 214 (i.e., instead of the towing bracket adapter 250). With respect to FIG. 5A, FIG. 5B, and FIG. 5C elements with like element numbering, as depicted in FIG. 2A, FIG. 2C, and FIG. 2D, are intended to be the same and will not necessarily be repeated for the sake of clarity.

Figure 5C:
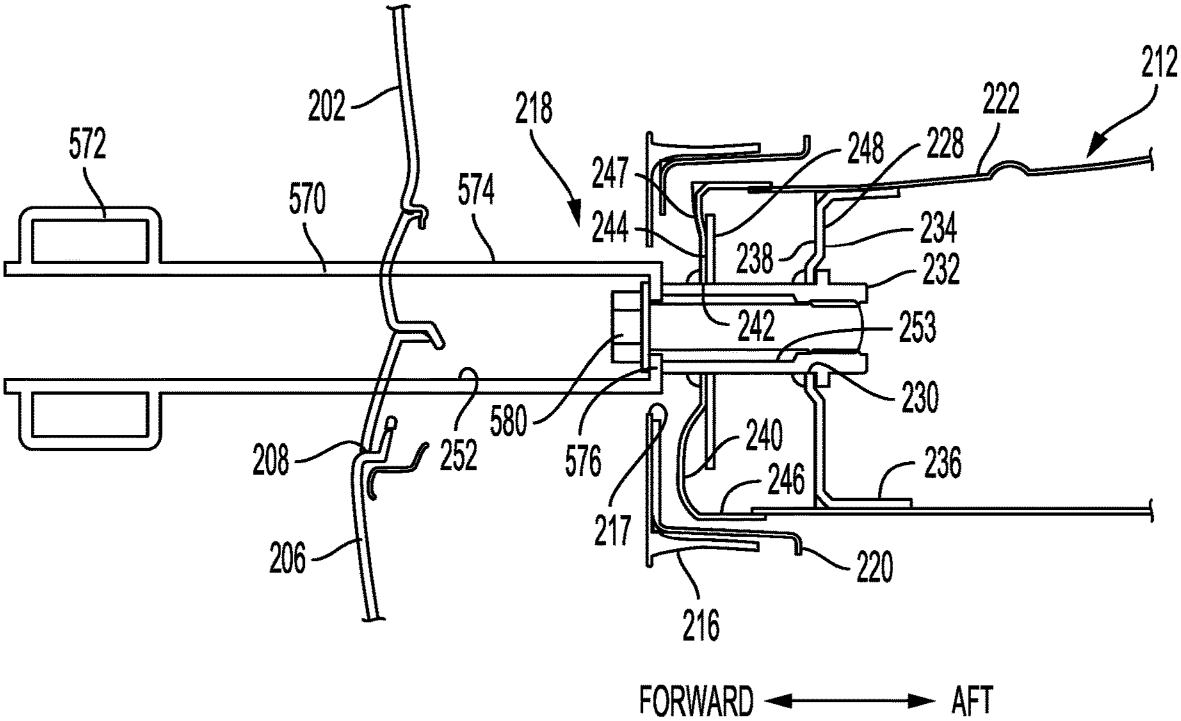
FIG. 5C is a section view of the body structure of the vehicle of FIG. 5A according to an aspect of the invention.

With combined reference to FIG. 5A, FIG. 5B, and FIG. 5C, the body structure 512 includes a tow bar attachment assembly 518 including the flat tow base plate 570 mounted to the end portion 224 of the front side member extension 214 via the nut fastener 232. The flat tow base plate 570 includes a lateral beam 572 and a pair of longitudinal beams 574 located at either end of the lateral beam 572. The longitudinal beams 574 can extend longitudinally aft from the lateral beam 572 when the flat tow base plate 570 is installed on the vehicle 500.

With particular focus on FIG. 5C, each longitudinal beam 574 can be a hollow beam defining a bore 252 terminating at an inwardly extending flange 576. The longitudinal beam 574 can be received through the front of the aperture 208 and aligned with the nut fastener 232. The bore 252 can be configured to receive a fastener 580 (e.g., a threaded bolt) through the front end thereof. The fastener 580 can be a bolt configured to extend aft from the bore 252 and threadingly engage the nut fastener 232 to secure the flat tow base plate 570 to the body structure 512. The fastener 580 can compress the flange 576 between the fastener 580 and the nut fastener 232. In this regard, the longitudinal beam 574 can extend forward from the nut fastener 232 and through the aperture 208.

With particular focus on FIG. 5B, the lateral beam 572 can include a pair of attachment points 578 whereby the pair of towing brackets 210 are mounted to the flat tow base plate 570. In various embodiments, the towing brackets 210 are installed to the flat tow base plate 570 in a manner similar to the way the towing bracket 310 is installed to the towing bracket adapter 350 as illustrated in FIG. 3A through FIG. 3C. For example, the attachment points 578 can be similar to the towing bracket adapter 350, in accordance with various embodiments. In various embodiments, the attachment points 578 can be similar to the hollow bore portion 251 of the towing bracket adapter 250 and can be embedded in the lateral beam 572. However, the towing brackets 210 can be mounted to the lateral beam 572 via any suitable method.

The attachment points 578 can be laterally offset from the longitudinal beams 574. For example, the attachment points 578 can be laterally inward from the longitudinal beams 574. In this manner, the flat tow base plate 570 can act as an adapter configured to adjust a point of attachment for a tow bar 1 (e.g., from the wider attachment points of the nut fasteners 232 and longitudinal beams 574 to the narrower attachment points of the attachment points 578).

In various embodiments, the lateral beam 572 is a metal beam, such as a metal, rectangular, hollow beam. In various embodiments, the longitudinal beams 574 are metal tubes, such as metal, round, hollow tubes.

Figure 6:
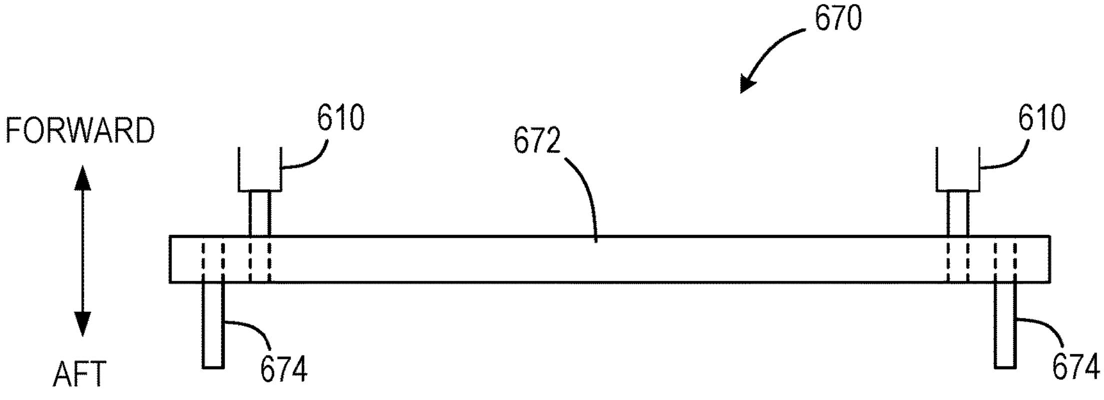
FIG. 6 is a schematic view of a flat tow base plate according to an aspect of the invention.

FIG. 6 is a schematic view of an exemplary flat tow base plate 670 having a lateral beam 672 and a pair of longitudinal beams 674 configured to attach to a vehicle. Towing brackets 610 are mounted to the lateral beam 672. In various embodiments, flat tow base plate 670 can be similar to the flat tow base plate 570 illustrated in FIG. 5A through FIG. 5C.

Aspects of a flat tow base plate kit, for example as illustrated in FIG. 5A through FIG. 6, includes a vehicle body/bumper structure designed to manage the increased load from flat towing, as well as meet all regulatory standards. The flat tow base plate kit can be bolted in by a user to allow attachment of an industry standard attachment, which would attach to a tow bar connected to the tow vehicle. An added benefit of this kit is it allows for adjustment of the location to attach the industry standard attachment in a vertical or horizontal direction. Similar to the thread-in adapter and the welded in adapter, the kit allows a user to retain the usage of a tow hook when the adapter is not installed, in accordance with various embodiments.

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A vehicle, comprising:
- a body structure, including:
  - a front side member support having an end portion;
  - a bumper beam mounted to the end portion of the front side member support;
  - a front side member plate mounted to the end portion of the front side member support, the front side member plate including a first central portion, a member plate aperture disposed in the first central portion, and a first flange portion extending from the first central portion, the front side member plate is mounted to the end portion of the front side member support via the first flange portion;

a nut fastener mounted to the front side member plate and extending through the member plate aperture; and a towing bracket adapter threadingly coupled to the nut fastener, the towing bracket adapter defines a bore that is forward-facing when the towing bracket adapter is attached to the nut fastener, and the bore is configured to receive a towing bracket for flat towing the vehicle.

2. The vehicle of claim 1, wherein the nut fastener extends from an outer surface of the first central portion of the front side member plate.

3. The vehicle of claim 1, further comprising a front bumper mounting plate mounted to the end portion of the front side member support, the front bumper mounting plate is located forward of the front side member plate, the front bumper mounting plate is located between the bumper beam and the front side member plate, and the bumper beam is mounted to the end portion of the front side member support via the front bumper mounting plate.

4. The vehicle of claim 3, wherein the front bumper mounting plate includes a second central portion, a mounting plate aperture disposed in the second central portion, and a second flange portion extending from the second central portion, the front bumper mounting plate is mounted to the end portion of the front side member support via the second flange portion, and the nut fastener extends through the mounting plate aperture.

5. The vehicle of claim 1, wherein the towing bracket adapter includes a tab disposed in the bore that is configured to stop the towing bracket from exiting the bore in response to the towing bracket being rotated to a locked rotational position.

6. The vehicle of claim 1, wherein the nut fastener is welded to the front side member plate.

7. The vehicle of claim 1, further comprising a vehicle panel and a vehicle panel aperture disposed in the vehicle panel, and the vehicle panel aperture is aligned with the towing bracket adapter.

8. A vehicle, comprising:

a body structure, including:

a front side member support having an end portion;

a bumper beam mounted to the end portion of the front side member support;

a front side member plate mounted to the end portion of the front side member support, the front side member plate including a first central portion, a member plate aperture disposed in the first central portion, and a flange portion extending from the first central portion, the front side member plate is mounted to the end portion of the front side member support via the flange portion; and a towing bracket adapter attached to the front side member plate and extending through the member plate aperture, the towing bracket adapter defines a bore that is forward-facing, and the bore is configured to receive a towing bracket for flat towing the vehicle.

9. The vehicle of claim 8, further comprising a front bumper mounting plate mounted to the end portion of the front side member support, the front bumper mounting plate is located forward of the front side member plate, the front bumper mounting plate is located between the bumper beam and the front side member plate, and the bumper beam is mounted to the end portion of the front side member support via the front bumper mounting plate.

10. The vehicle of claim 9, wherein the front bumper mounting plate includes a second central portion, a mounting plate aperture disposed in the second central portion, and a second flange portion extending from the second central portion, the front bumper mounting plate is mounted to the end portion of the front side member support via the second flange portion, and the towing bracket adapter extends through the mounting plate aperture.

11. The vehicle of claim 8, wherein the towing bracket adapter includes a tab disposed in the bore that is configured to stop the towing bracket from exiting the bore in response to the towing bracket being rotated to a locked rotational position with respect to the towing bracket adapter.

12. The vehicle of claim 8, wherein the towing bracket adapter is welded to the front side member plate.

13. The vehicle of claim 8, further comprising a vehicle panel and a vehicle panel aperture disposed in the vehicle panel, and the vehicle panel aperture is aligned with the towing bracket adapter.

14. A vehicle, comprising:

a body structure, including:

a front side member support having an end portion;

a bumper beam mounted to the end portion of the front side member support;

a front side member plate mounted to the end portion of the front side member support and including a first central portion, a member plate aperture disposed in the first central portion, and a first flange portion extending from the first central portion, the front side member plate is mounted to the end portion of the front side member support via the first flange portion;

a nut fastener mounted to the front side member plate and extending through the member plate aperture; and a vehicle panel having a vehicle panel aperture disposed in the vehicle panel, the vehicle panel aperture is aligned with the nut fastener.

15. The vehicle of claim 14, further comprising a front bumper mounting plate mounted to the end portion of the front side member support, the front bumper mounting plate is located forward of the front side member plate, the front bumper mounting plate is located between the bumper beam and the front side member plate, the bumper beam is mounted to the end portion of the front side member support via the front bumper mounting plate; and wherein the front bumper mounting plate includes a second central portion, a mounting plate aperture disposed in the second central portion, and a second flange portion extending from the second central portion, the front bumper mounting plate is mounted to the end portion of the front side member support via the second flange portion, and the nut fastener extends through the mounting plate aperture.

16. The vehicle of claim 14, further comprising:

a flat tow base plate including a lateral beam and a pair of longitudinal beams extending from the lateral beam;

a fastener configured to be received within a first longitudinal beam of the pair of longitudinal beams, the fastener is configured to threadingly coupled to the nut fastener; and a pair of towing brackets configured to be coupled to the lateral beam for flat towing the vehicle.

17. The vehicle of claim 16, wherein the first longitudinal beam is configured to extend through the aperture in the vehicle panel when the flat tow base plate is installed to the vehicle.

* * * * *